United States Patent [19]

Hlinsky

[11] Patent Number: 5,334,056
[45] Date of Patent: Aug. 2, 1994

[54] AUTOMATIC CABLE CONNECTOR WITH IMPACT HAMMER

[75] Inventor: Emil J. Hlinsky, Oak Brook, Ill.

[73] Assignee: MacLean-Fogg Company, Mundelein, Ill.

[21] Appl. No.: 49,167

[22] Filed: Apr. 19, 1993

[51] Int. Cl.⁵ .............................................. H01R 4/52
[52] U.S. Cl. .................................. 439/820; 439/821
[58] Field of Search .............................. 439/816-823, 439/840, 841, 729

[56] References Cited

U.S. PATENT DOCUMENTS

| | | |
|---|---|---|
| 2,077,737 | 3/1936 | Brandt . |
| 2,554,387 | 5/1951 | Saul . |
| 3,989,341 | 11/1976 | Ball ........................ 439/819 |
| 4,362,352 | 12/1982 | Hawkins et al. . |
| 4,528,849 | 7/1985 | Paschkis ................. 439/819 |

FOREIGN PATENT DOCUMENTS 0386498  1/1933  United Kingdom ............... 439/820

OTHER PUBLICATIONS

Brochure of Reliable Power Products, Inc., entitled "Wirelink, Wirevise, Strandlink, Strandvise", published prior to the present invention.

*Primary Examiner*—David L. Pirlot
*Attorney, Agent, or Firm*—Mason, Kolehmainen, Rathburn & Wyss

[57] ABSTRACT

An automatic cable connector includes a hammer that is moved to a cocked position by the end of an inserted cable. A hammer spring is compressed during the cocking motion. When the cocked position is reached, a frangible abutment fractures and the hammer is free to move independently of the cable. The spring drives the hammer into tapered gripping jaws with an impact that firmly grips the jaws onto the cable.

16 Claims, 2 Drawing Sheets

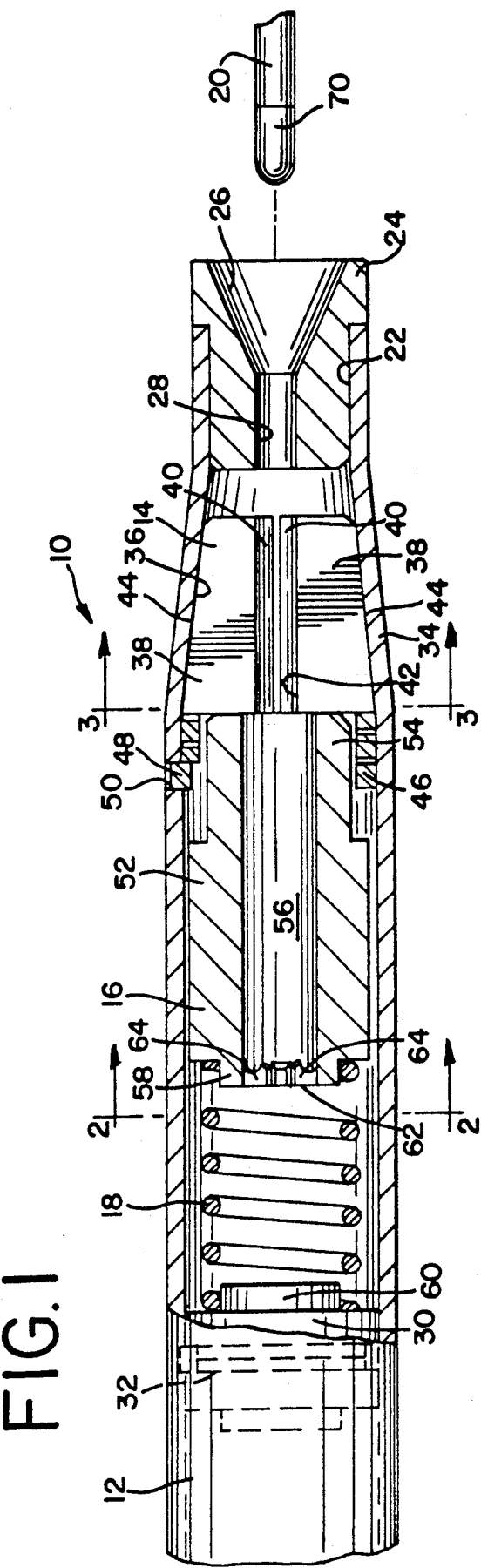
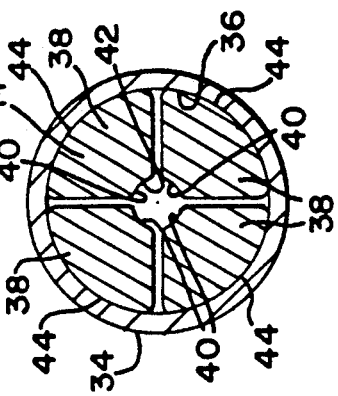
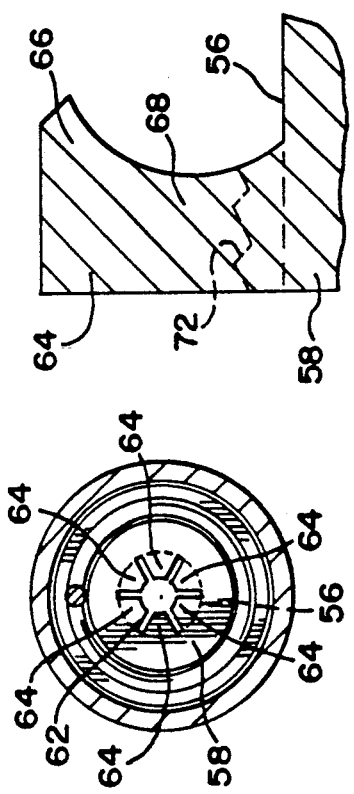

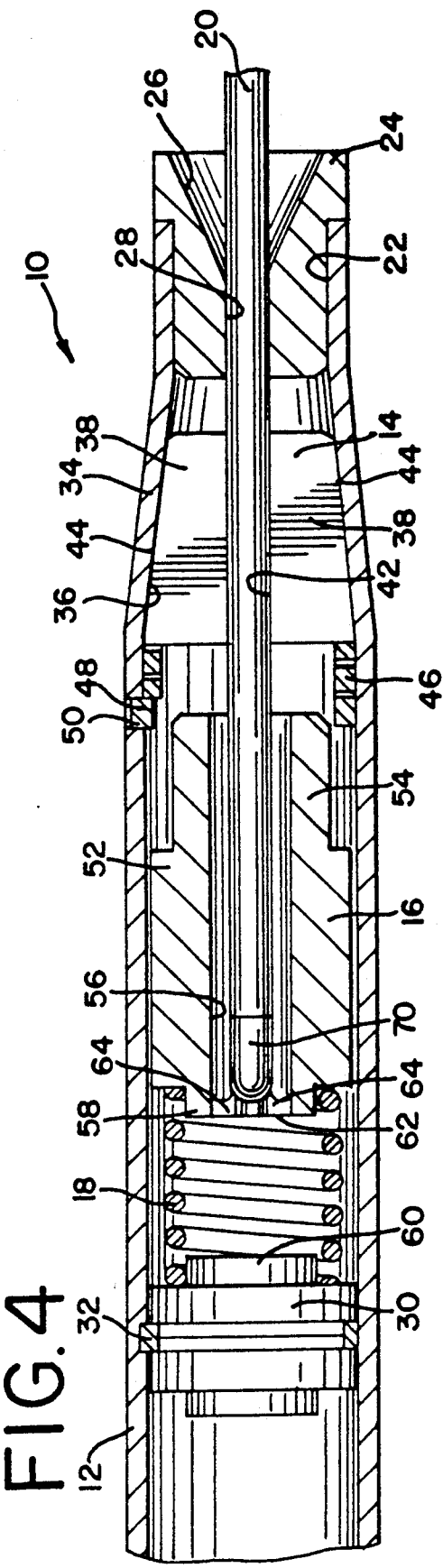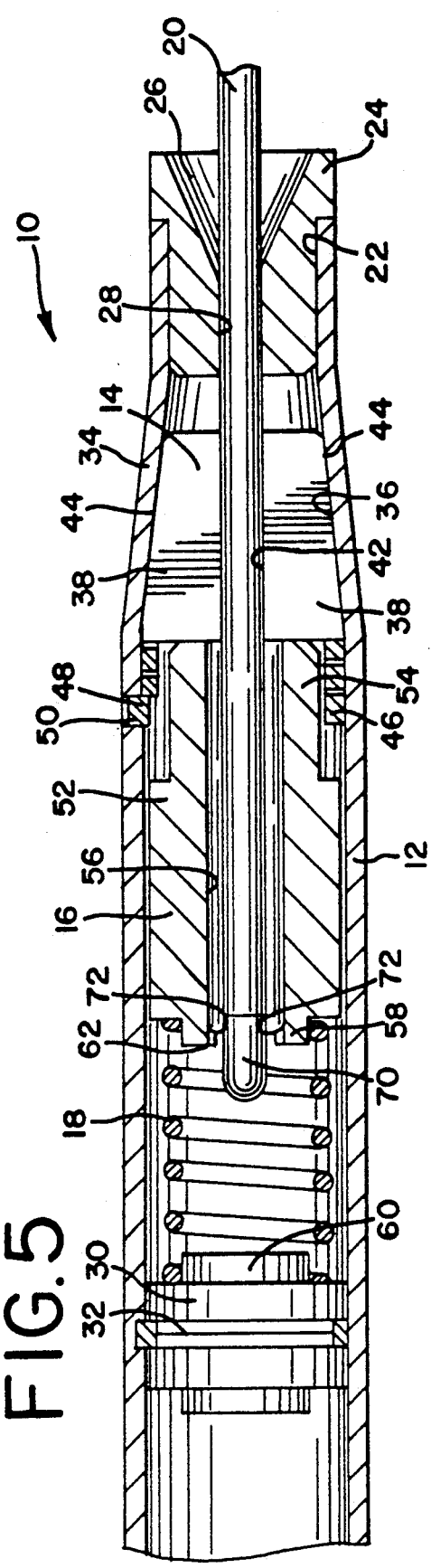

AUTOMATIC CABLE CONNECTOR WITH IMPACT HAMMER

BACKGROUND OF THE INVENTION

1. Field of the Invention

The present invention relates to connectors for automatically making a mechanical or electrical and mechanical connection to an inserted cable end using the wedge action of tapered jaws. More particularly, the invention relates to an automatic cable connector using the impact of a hammer for closing the cable gripping jaws.

2. Background of the Invention

A typical automatic cable connector includes a tubular housing with an open end into which a cable end is received. The housing includes a tapered surface that cooperates with tapered jaw segments. A spring continually biases the jaw segments toward the tapered surface. When a cable end is inserted, it moves the jaws away from the tapered surface against the bias of the spring, permitting the cable to pass between the jaws. After the cable is inserted, the spring biases the jaw segments into engagement with the tapered surface. When the cable is then subjected to tension, the jaws are pulled against the tapered surface to firmly grip the cable. Examples of this known type of automatic cable connector are the STRANDVISE cable termination connectors and STRANDLINK cable splice connectors of Reliable Power Products, Inc. shown in a brochure entitled "Wirelink, Wirevise, Strandlink Strandvise" published prior to the present invention.

The conventional arrangement works well in those installations where the cable is subjected to substantial tension after insertion into the cable connector. However, there are applications, such as slack span installations, where the cable is subjected to little or no tension. In this case, the cable tension does not always provide the force necessary to create a sufficient jaw gripping reaction against the tapered surface of the housing. Although an installer can apply tension to the cable during installation for the specific purpose of generating the jaw gripping force, the resulting jaw grip effectiveness depends on consistent and proper installation techniques.

In order to overcome this problem, it has been proposed to rely on the force of a strong jaw biasing spring instead of wire tension to provide the jaw gripping force. When this approach is employed, if the jaws are continuously biased by the spring, the large spring force makes it difficult to insert a cable end between the jaw segments. Accordingly, known connectors of this type include a mechanism for holding the spring in a compressed state, away from the jaw segments, until a cable end is inserted and for releasing the spring to contact the jaw segments after the cable end is inserted.

U.S. Pat. No. 2,077,737 discloses cable joints with spring biased wedges reacting against tapered surfaces to grip inserted cable ends. The spring is compressed during assembly, and is held in the compressed state by lock pins or pivoted dogs. When a cable end is inserted through the wedges, it releases the pins or dogs to release the spring. The spring biases the wedges toward the tapered surfaces.

U.S. Pat. No. 2,554,387 discloses a wire grip in which the jaws initially are not biased to a wire gripping position. A spring is compressed when the device is assembled and is held by a trigger. When a wire is inserted completely through the jaws, it engages and releases the trigger, freeing the spring to bias the jaws against a tapered surface so that the jaws grip the wire.

U.S. Pat. No. 4,362,352 discloses splicing devices with spaced apart cable gripping members driven into tapered surfaces by the force of a massive spring having an at rest length substantially longer than the space between the gripping members. The spring is compressed when the device is assembled and before a cable is inserted. After the cable is inserted, the spring is released by cutting a cord (FIGS. 1 and 4), disconnecting (FIG. 2) or severing (FIG. 3) a rod, or severing a retaining washer (FIG. 5).

SUMMARY OF THE INVENTION

It is an object of the present invention to provide an automatic cable connector in which the jaws are forced into a gripping position by impact of a hammer rather than by direct action of a jaw biasing spring. Another object is to provide an automatic cable connector in which it is not necessary to compress a jaw biasing spring at the time of assembly nor to maintain the spring in compression until a cable is inserted. Another object is to provide an automatic cable connector in which the energy for the jaw grip setting force is supplied by insertion of a cable rather than by tension of the cable after insertion. Other objects are to provide an automatic cable connector that is easy to install, that assures that an inserted cable is fully seated, that does not rely on the installer's skill to achieve reliable operation and that does not require complicated mechanisms with delicate moving parts.

In brief, in accordance with the present invention there is provided an automatic cable connector for making a connection to the end of a cable. The connector includes a tubular housing having an open end for receiving the inserted cable end and having a tapered surface adjacent the open end. A jaw assembly includes a plurality of tapered jaw segments surrounding a cable insertion path extending axially into the housing from the open end. The jaw segments cooperate with the tapered surface to close against the cable end in the cable insertion path when the jaw segments are forced toward the open end. A barrier in the housing is spaced from the jaw assembly. A hammer is supported for axial movement in the housing between the barrier and the jaw assembly, the hammer being movable between an extended position adjacent the jaw assembly and a cocked position spaced from the jaw assembly. A hammer spring is located between the hammer and the barrier. The hammer is in the extended position prior to insertion of the cable end into the housing. The hammer spring has a relaxed length such as to be substantially uncompressed in the extended position of the hammer. The hammer has an abutment aligned with the cable insertion path. During insertion of the cable end, it engages the abutment and moves the hammer to the cocked position while compressing the hammer spring. The hammer is freed from the cable end in the cocked position of the hammer to permit the hammer spring to drive the hammer to impact against the jaw assembly.

In brief, in accordance with the present invention, there is provided a method for gripping a cable with an automatic connector having wedge-shaped jaws reacting against a tapered housing surface surrounding an inserted cable. The method includes the step of inserting a cable end between the jaws and against a hammer normally located adjacent the jaws. The insertion of the cable is continued in order to move the hammer to a cocked position spaced from the jaws and in order to compress a hammer spring located behind the hammer. The hammer is freed from the cable end so that the hammer spring drives the hammer against the jaws.

DESCRIPTION OF THE VIEWS OF THE DRAWING

The present invention together with the above and other objects and advantages will appear from the following detailed description of the embodiment of the invention shown in the accompanying drawings, wherein:

FIG. 1 is a fragmentary, partly cross-sectional view of an automatic cable connector constructed in accordance with the present invention and of the end of a cable prior to insertion into the connector;

FIG. 2 is a cross sectional view taken along the line 2—2 of FIG. 1;

FIG. 2A is a greatly enlarged fragmentary sectional view of one frangible abutment;

FIG. 3 is a cross sectional view taken along the line 3—3 of FIG. 1;

FIG. 4 is a view like FIG. 1 showing the inserted cable end moving a hammer from the normal, extended position toward a cocked position; and FIG. 5 is a view like FIGS. 1 and 4 showing the connector after a connection is made to the inserted cable end.

DETAILED DESCRIPTION OF THE PREFERRED EMBODIMENT

Having reference now to the drawings, and first to FIGS. 1-3, there is shown an automatic cable connector generally designated as 10 and constructed in accordance with the principles of the present invention. In general, the connector 10 includes a housing 12, a jaw assembly 14, a hammer 16 and a hammer spring 18. In accordance with an important feature of the invention, when a cable 20 is inserted into the connector 10, energy is stored in the spring 18 as the cable 20 moves the hammer 16 away from the jaw assembly 14. When the hammer is automatically freed, the stored energy is used to drive the hammer 16 into the jaw assembly 14. The impact causes the jaw assembly 14 to firmly grip the cable 20.

Housing 12 is generally tubular and has a cable receiving opening 22 at one end. It may be fabricated of a suitable material such as aluminum. In the illustrated embodiment of the invention, a cable guide 24 is secured to the end 22 of the housing. Guide 24 includes an entry bevel 26 and a passage 28 establishes a maximum diameter for the inserted cable 20. A fixed barrier 30 is located within the housing 12 spaced from the cable receiving opening 22. The barrier may be secured in any desired way, as by a split ring fastener 32 or may be integral with the housing. Near the cable receiving opening 22 the housing includes a tapered portion 34 defining a tapered interior surface 36 cooperating with the jaw assembly 14.

Jaw assembly 14 includes four similar jaw segments 38 made of steel or aluminum generally axially aligned with the tapered surface 36. At their interior portions, the segments 38 include axially extending curved portions 40 cooperating to define part of an axially extending cable insertion path 42 leading from the cable receiving opening 22. The segments 38 are slightly spaced apart along radial regions, and the outer surfaces 44 are curved and tapered to cooperate with the tapered housing surface 36.

A relatively light jaw biasing spring 46 continuously urges the segments 38 into contact with the tapered surface 36. Spring 46 is secured by deflecting an end 48 of the spring into a securement opening 50 in the wall of the housing 12. When the segments 38 move toward the opening 22, they are forced toward one another by reaction against the tapered surface 36 to close onto the path 42 and grip a cable 20 present in the path. Spring 46 is not strong enough to create a significant gripping force. When the jaw segments 38 move away from the opening 22, the space between the surfaces 40 increases and the cable 20 may be inserted along the path 42. Spring 46 is weak enough so as not to significantly oppose insertion of the cable 20.

Hammer 16 is preferably a massive, unitary and one-piece body of forged steel or the like. It includes a main body 52 and a reduced diameter nose portion 54 that fits within spring 46. An axial opening 56 extends throughout the length of the hammer 16.

Hammer spring 18 is a relatively strong spring. It is received between a first positioning abutment 58 on the rear of the hammer 16 and a second positioning abutment 60 on the barrier 30. The relaxed length of the spring 18 is seen in FIG. 1. The spring is not appreciably compressed in the normal, extended hammer position of FIG. 1 and does not apply any significant force to the hammer 16 or jaw segments 38. Thus, in the normal position seen in FIG. 1, the jaw assembly 14 does not impose any substantial resistance to insertion of the cable 20.

Hammer 16 includes an abutment system 62 best seen in FIGS. 1 and 2. The purpose of the abutment system 62 is to permit the cable 20 to move the hammer 16 from the normal extended position of FIG. 1 toward a cocked position as seen in FIG. 3, while at the same time compressing the hammer spring 18. The abutment system 62 also functions to free the hammer 16 from the cable 20 so that energy stored in the compressed spring 18 can drive the hammer 16 into the jaw assembly 14. The resulting impact causes the jaw segments 38 to react against the tapered surface 36 and provide a firmly wedged and consistent jaw grip force against the inserted cable.

Abutment system 62 includes a plurality of inwardly extending abutment fingers 64 made integral and of one homogeneous piece with the hammer 16. In the illustrated arrangement, there are six fingers 64, although more or fewer may be used depending upon the desired performance. As seen in FIG. 2A, each finger 64 includes a head portion 66 positioned within the axial opening 56 where it is contacted by the leading end of the inserted cable 20. Each finger also includes a reduced thickness frangible stem portion 68. Portions 68 are sized to break when subjected to a predetermined force.

More specifically, and referring to the use of the connector 10 and to the methods of the present invention, in order to make a connection with cable 20, the end of the cable is inserted into the guide 24 and through the cable receiving opening 22 of the housing 12. Cable 20 may be stranded or solid, and may be used for mechanical or electrical service. Preferably a pilot cap 70 is applied to the cable end to prevent strands or burrs on the cable end from interfering with the operation of the connector 10.

The inserted cable enters into the housing 12 and moves along the cable insertion path 42. The cable end moves between the jaw segments 38 toward the hammer 16. The light jaw biasing spring 46 permits the jaw segments 38 to retract and separate in order to facilitate cable entry.

As the cable reaches the hammer 16, it enters the axial opening 56 as it continues along the cable insertion path 42. Near the end of the opening 56, the cable end engages the heads 66 of the abutment fingers 64. Further insertion of the cable 20 moves the hammer 16 away from the jaw assembly 14 (to the left as viewed in FIG. 4) to a cocked position as a result of force applied by the cable 20 to the fingers 64. As the hammer 16 moves away from the jaw assembly 14, the hammer spring 18 is compressed.

Energy is stored in the hammer spring 18 as the spring compresses. As the amount of spring compression increases, the force applied by the cable 20 to the hammer 16 and spring 18 increases. This increasing force is applied across the frangible stems 68 of the abutments 64. When the force reaches a predetermined magnitude corresponding to a fully cocked position of the hammer 16, the stems 68 fracture as indicated at 72 in FIGS. 5 and 2A and the abutments 64 break away from the hammer 16. This has the result of freeing the hammer 16 from the cable 20. Preferably the fully cocked position is near the fully compressed position of spring 18. FIG. 4 shows the hammer 16 approaching the cocked position.

When the hammer 16 is freed from the cable 20 by fracture of the abutments 64, the energy stored in the hammer spring 18 drives the hammer 16 toward the jaw assembly 14. The hammer 16 is accelerated throughout this movement. The nose portion 54 of the hammer 16 strikes the jaw segments 38 and this impact in turn drives the jaw segments 38 into the beveled housing section 34. When hammer 16 is withdrawn toward the cocked position, the jaw bias spring 46 maintains contact of the jaw segment surfaces 44 against the beveled surface 36 to maximize energy transfer upon impact.

When the jaw segments 38 are driven by the hammer impact into the beveled surface 36, the reaction causes the jaw segments firmly to grip the cable 20 as seen in FIG. 5. Energy stored during cable insertion is used to set the gripping jaws. The force and security of the grip does not depend upon tension applied to the cable after installation, nor upon the skill or technique of the installer. The connection cannot be made unless the cable is fully seated within the connector 10. The system is fail-safe in the sense that if the abutment fingers do not fracture precisely at the intended cocked position, the force increases until fracture does occur, even after the spring 18 reaches the full extent of possible compression.

The connector 10 can be used to make an electrical and mechanical connection or only a mechanical connection in the case of a guy cable or the like. For a splice connector, the connector 10 may be double ended and include a second jaw assembly, hammer and hammer spring in opposition to the elements described above. In that case, each half of the splice connector can be installed to a cable 20 independently of the other. For a termination connector, the connector 10 may be single ended and include a support bail or other suitable securing structure at the opposite end.

While the invention has been described with reference to details of the illustrated embodiment, such details are not intended to limit the scope of the invention as claimed in the appended claims.

What is claimed is:

1. An automatic cable connector for making a connection to the end of a cable, said cable connector comprising:
    a tubular housing having an open end for receiving the inserted cable end and having a tapered surface adjacent said open end;
    a jaw assembly including a plurality of tapered jaw segments surrounding a cable insertion path extending axially into said housing from said open end, said jaw segments cooperating with said tapered surface to close against the cable end in the cable insertion path when said jaw segments are forced toward said open end;
    barrier means in said housing spaced from said jaw assembly;
    a hammer supported for axial movement in said housing between said barrier means and said jaw assembly, said hammer being movable between an extended position adjacent said jaw assembly and a cocked position spaced from said jaw assembly; and
    a hammer spring between said hammer and said barrier means;
    said cable connector being characterized by:
    said hammer being in said extended position prior to insertion of the cable end into said housing;
    said hammer spring having a relaxed length such as to be substantially uncompressed in said extended position of said hammer;
    said hammer having an abutment aligned with the cable insertion path, the cable end during insertion engaging the abutment for moving said hammer to the cocked position and for compressing said hammer spring; and
    hammer release means for freeing said hammer from the cable end in the cocked position of said hammer to permit said hammer spring to drive said hammer to impact against said jaw assembly.

2. An automatic cable connector as claimed in claim 1 further comprising a cable guide at said open end of said housing for guiding the inserted cable end.

3. An automatic cable connector as claimed in claim 1 further comprising a jaw spring for continually biasing said jaw segments against said tapered surface.

4. An automatic cable connector as claimed in claim 1 further comprising a pilot cap applied over the tip of the inserted cable end.

5. An automatic cable connector as claimed in claim 1, said hammer having an axial opening for receiving the inserted cable end.

6. An automatic cable connector as claimed in claim 5, said abutment extending into said axial opening.

7. An automatic cable connector as claimed in claim 1, said hammer release means comprising frangible means between said abutment and said hammer.

8. An automatic cable connector as claimed in claim 7, said frangible means being constructed and arranged to break in response to a predetermined compression force stored in said hammer spring.

9. An automatic cable connector as claimed in claim 7, said abutment being integral and of one piece with said hammer.

10. An automatic cable connector as claimed in claim 7, comprising a plurality of said abutments, each integral and of one piece with said hammer.

11. An automatic connector for the end of a cable comprising:
   a tubular housing having a cable entry opening at one end and a spring force reaction barrier spaced from said entry opening;
   a plurality of wedge shaped jaw segments adjacent said entry opening;
   a tapered surface defined around said jaw segments;
   a massive hammer supported for movement between a normal position adjacent said jaw segments and a cocked position spaced from said jaw segments;
   a hammer spring between said barrier and said hammer;
   a cable insertion path extending from said entry end and through said jaw segments to said hammer;
   at least one breakable abutment extending from said hammer into said path for engagement by a cable inserted along said path;
   said at least one abutment being constructed and arranged to fracture in response to a predetermined compression force stored in said hammer spring when the inserted cable end contacts said at least one abutment and moves said hammer to said cocked position.

12. The automatic connector of claim 11, said hammer having a central axial opening aligned with said path, said at least one abutment extending into said axial opening.

13. The automatic connector of claim 12, comprising a plurality of said abutments each being integral and of one piece with said hammer.

14. A method for gripping a cable with an automatic connector having wedge-shaped jaws reacting against a tapered housing surface surrounding an inserted cable, said method comprising the steps of:
   inserting a cable end between the jaws and against a hammer normally located adjacent the jaws;
   continuing to insert the cable end in order to move the hammer to a cocked position spaced from the jaws and in order to compress a hammer spring located behind the hammer; and
   freeing the hammer from the cable end so that the hammer spring drives the hammer against the jaws.

15. A method as claimed in claim 14 wherein said freeing step includes permitting the stored spring force to fracture an abutment on the hammer engaged by the inserted cable.

16. A method for setting the gripping jaws of an automatic cable connector comprising the steps of:
   inserting the end of a cable into a housing of a connector;
   storing energy resulting from the cable insertion force; and
   using the stored energy to set the gripping jaws after the cable has been inserted;
   said storing step including compressing a spring with the cable insertion force, and said using step including transferring the energy stored in the spring to a hammer and impacting the hammer against the gripping jaws.

* * * * *